US012720347B2

(12) United States Patent
Lyazidi et al.

(10) Patent No.: US 12,720,347 B2
(45) Date of Patent: Aug. 25, 2026

(54) CONFIGURATION OF PERIODIC UE UL GRANT REPORTING OVER NRPPA

(71) Applicant: Telefonaktiebolaget LM Ericsson (publ), Stockholm (SE)

(72) Inventors: Yazid Lyazidi, Hässelby (SE); Ritesh Shreevastav, Upplands Väsby (SE); Åke Busin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 491 days.

(21) Appl. No.: 18/032,460

(22) PCT Filed: Oct. 22, 2021

(86) PCT No.: PCT/IB2021/059769

§ 371 (c)(1),
(2) Date: Apr. 18, 2023

(87) PCT Pub. No.: WO2022/084944

PCT Pub. Date: Apr. 28, 2022

(65) Prior Publication Data

US 2023/0388839 A1 Nov. 30, 2023

Related U.S. Application Data

(60) Provisional application No. 63/104,219, filed on Oct. 22, 2020.

(51) Int. Cl.

*H04W 24/10* (2009.01)
*H04L 5/00* (2006.01)
*H04W 64/00* (2009.01)

(52) U.S. Cl.

CPC ........... *H04W 24/10* (2013.01); *H04L 5/0051* (2013.01); *H04L 5/0055* (2013.01); *H04W 64/00* (2013.01)

(58) Field of Classification Search

CPC ....... H04W 4/02; H04W 24/10; H04W 64/00; H04L 5/0053; H04L 5/0055; H04L 5/0091; H04L 5/0051

(Continued)

(56) References Cited

U.S. PATENT DOCUMENTS

2010/0323720 A1* 12/2010 Jen .......................... H04W 64/00 455/456.1
2011/0002307 A1* 1/2011 Muller ................ H04W 36/249 370/332

(Continued)

FOREIGN PATENT DOCUMENTS

CN 111448835 A * 7/2020 ............ H04W 12/02
CN 112740776 A * 4/2021 ............ H04W 36/08

OTHER PUBLICATIONS

Author Unknown, "Technical Specification Group Radio Access Network; LTE Positioning Protocol (LPP) (Release 16)," Technical Specification 37.355, Version 16.2.0, Sep. 2020, 3GPP Organizational Partners, 296 pages.

(Continued)

*Primary Examiner* — Jean A Gelin
(74) *Attorney, Agent, or Firm* — Withrow & Terranova, PLLC

(57) ABSTRACT

Systems and methods are disclosed for User Equipment (UE) positioning for uplink grant resources. In one embodiment, a method performed by a location server includes sending one or more first New Radio Positioning Protocol Annex (NRPPa) messages to a base station that serves a target UE. Herein, the one or more first NRPPa messages include at least an expected periodical reporting of the target UE and provide priority indication associated with positioning requirements of the target UE so as to enable the base station to configure uplink grant resources. Also, the method further includes receiving, from the base station, a second (Continued)

NRPPa message that acknowledges a success or failure of the configured uplink grant resources.

26 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2014/0080509 | A1 | 3/2014 | Siomina et al. | |
| 2018/0199226 | A1* | 7/2018 | Tsai | H04W 24/10 |
| 2020/0092776 | A1* | 3/2020 | Edge | H04W 8/08 |
| 2020/0154240 | A1 | 5/2020 | Edge et al. | |
| 2021/0112474 | A1* | 4/2021 | Manolakos | H04W 36/00692 |
| 2021/0185632 | A1* | 6/2021 | Manolakos | G01S 5/0205 |
| 2021/0400620 | A1* | 12/2021 | Tao | H04W 24/10 |
| 2022/0039053 | A1* | 2/2022 | Edge | H04W 4/02 |
| 2022/0045827 | A1* | 2/2022 | Lee | H04W 72/30 |
| 2022/0060853 | A1* | 2/2022 | Gummadi | H04W 4/029 |
| 2022/0086624 | A1* | 3/2022 | Cui | H04W 16/14 |
| 2022/0116904 | A1* | 4/2022 | Fakoorian | H04W 28/0975 |
| 2022/0120842 | A1* | 4/2022 | Edge | H04W 64/00 |
| 2023/0084239 | A1* | 3/2023 | Cha | H04W 52/146 455/522 |
| 2023/0379859 | A1* | 11/2023 | Barbu | G01S 5/06 |
| 2023/0422202 | A1* | 12/2023 | Manolakos | H04W 64/00 |
| 2025/0271536 | A1* | 8/2025 | Huang | G01S 5/0284 |

OTHER PUBLICATIONS

Author Unknown, "Technical Specification Group Radio Access Network; NG Radio Access Network (NG-RAN); Stage 2 functional specification of User Equipment (UE) positioning in NG-RAN (Release 15)," Technical Specification 38.305, Version 15.4.0, Jun. 2019, 3GPP Organizational Partners, 72 pages.

Author Unknown, "Technical Specification Group Radio Access Network; NG-RAN; NG Application Protocol (NGAP) (Release 16)," Technical Specification 38.413, Version 16.3.0, Sep. 2020, 3GPP Organizational Partners, 466 pages.

Author Unknown, "Technical Specification Group Radio Access Network; NG-RAN; NR Positioning Protocol A (NRPPa) (Release 16), " Technical Specification 38.455, Version 16.1.0, Sep. 2020, 3GPP Organizational Partners, 147 pages.

Author Unknown, "Technical Specification Group Radio Access Network; NG-RAN; F1 application protocol (F1AP) (Release 16)," Technical Specification 38.473, Version 16.3.1, Oct. 2020, 3GPP Organizational Partners, 455 pages.

Huawei, et al., "R2-1913039: Considerations on UL only positioning method in NR," 3GPP TSG-RAN WG2 Meeting #107bis, Oct. 14-18, 2019, Chongqing, China, 6 pages.

Qualcomm Incorporated, "R2-1909416: DL and UL NR Positioning Procedures," 3GPP TSG-RAN WG2 Meeting #107, Aug. 26-30, 2019, Prague, Czech Republic, 10 pages.

Qualcomm Incorporated, "R3-193586: Local NR positioning in NG-RAN," 3GPP TSG-RAN WG3 Meeting #105, Aug. 26-30, 2019, Ljubljana, Slovenia, 31 pages.

VIVO, "R2-2006567: Discussion on potential positioning enhancement, " 3GPP TSG-RAN WG2 Meeting #111, Aug. 17-28, 2020, Electronic Meeting, 7 pages.

International Search Report and Written Opinion for International Patent Application No. PCT/IB2021/059769, mailed Feb. 1, 2022, 21 pages.

Written Opinion for International Patent Application No. PCT/IB2021/059769, mailed Sep. 27, 2022, 12 pages.

International Preliminary Report on Patentability for International Patent Application No. PCT/IB2021/059769, mailed Jan. 25, 2023, 24 pages.

Huawei, et al., "R2-1914980: Considerations on DL procedures for NR positioning," 3GPP TSG-RAN WG2 Meeting #108, Nov. 18-22, 2019, Reno, Nevada, 5 pages.

Qualcomm Incorporated, "R3-203628: (TP to BL CR#0008 / 38.455 on NR Positioning) Further considerations on NRPPa rel-16," 3GPP TSG-RAN WG3 Meeting #108-e, Jun. 1-12, 2020, Electronic Meeting, 11 pages.

VIVO, "R1-2005381: Discussion on potential positioning enhancements," 3GPP TSG RAN WG1 #102-e, Aug. 17-28, 2020, Electronic Meeting, 20 pages.

Examination Report for European Patent Application No. 21810425.5, mailed May 10, 2024, 8 pages.

Notice of Reasons for Refusal for Japanese Patent Application No. 2023-522559, mailed Mar. 29, 2024, 6 pages.

Decision to Grant for Japanese Patent Application No. 2023-522559, mailed Sep. 2, 2024, 6 pages.

* cited by examiner

CONFIGURATION OF PERIODIC UE UL GRANT REPORTING OVER NRPPA

RELATED APPLICATIONS

This application is a 35 U.S.C. § 371 national phase filing of International Application No. PCT/IB2021/059769, filed Oct. 22, 2021, which claims the benefit of provisional patent application Ser. No. 63/104,219, filed Oct. 22, 2020, the disclosures of which are hereby incorporated herein by reference in their entireties.

TECHNICAL FIELD

The present disclosure relates to User Equipment (UE) positioning for uplink (UL) grant resources.

BACKGROUND

NR Positioning Architecture

Since Release-15 and an introduction in New Radio (NR), a Long Term Evolution Positioning Protocol (LPP), which is a point-to-point communication protocol between a Location Management Function (LMF) and a target device, has been agreed to be reused for User Equipment (UE) positioning in both NR and Long Term Evolution (LTE) (TS 37.355).

At a core network, a new logical node LMF is the main server responsible for computing the UE position, based on the NR, Evolved Universal Terrestrial Radio Access (E-UTRA), or both RATs specific positioning methods. New Radio Positioning Protocol Annex (NRPPa) is a communication protocol between a Next Generation Radio Access Network (NG-RAN) and an LMF.

FIG. 1 is a reproduction of FIGS. 5.1-1 of Third Generation Partnership Project (3GPP) Technical Specification (TS) 38.305 V15.4.0, which shows the network architecture for positioning purposes. As illustrated, the Fifth Generation (5G) System (5GS) architecture for positioning purposes includes a NG-RAN including a next generation Node B (gNB) and a next generation enhanced or evolved Node B (ng-eNB), and a 5G Core (5GC) including an Access and Mobility Management Function (AMF) and a LMF. The LMF may have a signaling connection to an Evolved Serving Mobile Location Center (E-SMLC) and a Secure User Plane Location (SUPL) Location Platform (SLP). Regarding this architecture, Section 5.1 of 3GPP TS 38.305 V15.4.0 states:

[REPRODUCED HEREIN AS FIG. 1]

FIG. 5.1-1: UE Positioning Architecture applicable to NG-RAN

FIG. 5.1-1 shows the architecture in 5GS applicable to positioning of a UE with NG-RAN or E-UTRAN access.

The AMF receives a request for some location service associated with a particular target UE from another entity (e.g., GMLC) or the AMF itself decides to initiate some location service on behalf of a particular target UE (e.g., for an IMS emergency call from the UE) as described in TS 23.502 [26]. The AMF then sends a location services request to an LMF. The LMF processes the location services request which may include transferring assistance data to the target UE to assist with UE-based and/or UE-assisted positioning and/or may include positioning of the target UE. The LMF then returns the result of the location service back to the AMF (e.g., a position estimate for the UE. In the case of a location service requested by an entity other than the AMF (e.g., a GMLC), the AMF returns the location service result to this entity.

An ng-eNB may control several TPs, such as remote radio heads, or PRS-only TPs for support of PRS-based TBS for E-UTRA.

An LMF may have a signalling connection to an E-SMLC which may enable an LMF to access information from E-UTRAN (e.g. to support the OTDOA for E-UTRA positioning method using downlink measurements obtained by a target UE of signals from eNBs and/or PRS-only TPs in E-UTRAN). Details of the signalling interaction between an LMF and E-SMLC are outside the scope of this specification.

An LMF may have a signalling connection to an SLP. The SLP is the SUPL entity responsible for positioning over the user plane. Further details of user-plane positioning are provided in [15][16].

NOTE 1:

The gNB and ng-eNB may not always both be present.

NOTE 2:

When both the gNB and ng-eNB are present, the NG-C interface is only present for one of them (FFS).

New and enhanced positioning methods have been defined in NR (TS 38.305) such as:

- NR Enhanced Cell ID (E-CID);
- Multi-Round Trip Time (RTT) Positioning;
- Downlink Angle-of-Departure (DL-AoD);
- Downlink Time Difference of Arrival (DL-TDOA);
- Uplink Time Difference of Arrival (UL-TDOA);
- Uplink Angle of Arrival (UL-AoA), including the Azimuth of Arrival (A-AoA) and the Zenith of Arrival (Z-AoA).

An example of signalling exchange for multi-RTT positioning (also applicable for other methods) is shown in FIG. 2.

Configured Grant

With Configured Grants, the gNB can allocate uplink resources for the initial Hybrid Automatic Repeat Request (HARQ) transmissions and HARQ retransmissions to UEs. Two types of configured uplink grants are defined:

- With Type 1, Range Rate Correction (RRC) directly provides the configured uplink grant (including the periodicity).
- With Type 2, RRC defines the periodicity of the configured uplink grant, while Physical Downlink Control Channel (PDCCH) addressed to Configured Scheduling Radio Network Temporary Identifier (CS-RNTI) can either signal and activate the configured uplink grant, or deactivate it; i.e. a PDCCH addressed to CS-RNTI indicates that the uplink grant can be implicitly reused according to the periodicity defined by RRC, until deactivated.

Release-17 Enhancements for Positioning

While keeping the positioning NR architecture and the existing positioning techniques as they have been defined in Release-16, one goal of Release-17 positioning enhancements is to identify the possible signaling and procedures for improved accuracy, reduced latency, network efficiency, and device efficiency.

In order to meet the requirement of low latency, transmissions delays in the UL between the UE and the network should be reduced and optimized.

Currently, the UE reports its UL periodic positioning results via LPP Step 10 in FIG. 2, as per the periodicalReporting indication defined in TS 37.355 (see extract below), which has been sent from LMF in Step 8. This information element can indicate to UE the periodicity of the measurement reporting, provided the device supports such periodical reporting in its UE capabilities (informed in Step 0).

periodicalReporting
This IE indicates that periodical reporting is requested and comprises the following subfields:
reportingAmount indicates the number of periodic location information reports requested. Enumerated values correspond to 1, 2, 4, 8, 16, 32, 64, or infinite/indefinite number of reports. If the reportingAmount is 'infinite/indefinite', the target device should continue periodical reporting until an LPP Abort message is received. The value 'ra1' shall not be used by a sender.
reportingInterval indicates the interval between location information reports and the response time requirement for the first location information report. Enumerated values ri0-25, ri0-5, ri1, ri2, ri4, ri8, ri16, ri32, ri64 correspond to reporting intervals of 1, 2, 4, 8, 10, 16, 20, 32, and 64 seconds, respectively. Measurement reports containing no measurements or no location estimate are required when a reportingInterval expires before a target device is able to obtain new measurements or obtain a new location estimate. The value 'noPeriodicalReporting' shall not be used by a sender.

UE Identifier

For the message sent from the LMF to the gNB via NRPPa, the UE is identified in the Next Generation Application Protocol (NG-AP) transport message by temporary ID: AMF UE NGAP ID and RAN UE NGAP ID as shown below from NGAP specification (TS 38.413).

Downlink UE Associated NRPPA Transport

This message is sent by the AMF and is used for carrying NRPPa message over the NG interface.
Direction: AMF=>NG-RAN node

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| AMF UE NGAP ID | M | | 9.3.3.1 | | YES | reject |
| RAN UE NGAP ID | M | | 9.3.3.2 | | YES | reject |
| Routing ID | M | | 9.3.3.13 | | YES | reject |
| NRPPa-PDU | M | | 9.3.3.14 | | YES | reject |

SUMMARY

Systems and methods are disclosed herein for signaling, over New Radio Positioning Protocol Annex (NRPPa), the periodicity of User Equipment (UE) periodical location information reporting to a next generation (NR) base station along with Quality of Service (QoS) information in terms of latency and/or accuracy. The base station can take the location information into account for prioritizing and configuring the UE's existing uplink (UL) grant(s) accordingly. The UE can then send its periodic Long-Term Evolution Positioning Protocol (LPP) Positioning report while avoiding clashes with other UL transmissions. Further, a Location Management Function (LMF) is able to compute measurements from the first few measurement reports obtained from the UE, and inform the base station to abort/release the configured grant resource.

Embodiments of a method performed by a location server (e.g. LMF) in UE positioning are disclosed. In one embodiment, the method comprises sending one or more first NRPPa messages to a base station that serves a target UE and receiving a second NRPPa message from the base station. Herein, the one or more first NRPPa messages include an expected periodical reporting of the target UE, and provide priority indication associated with positioning requirements of the target UE so as to enable the base station to configure UL grant resources. The second NRPPa message acknowledges a success or failure of the configured UL grant resources.

In one embodiment of the method performed by the location server, the one or more first NRPPa messages sent to the base station further include a request for UL Sounding Reference Signal (UL-SRS) configuration of the target UE from the serving base station.

In one embodiment of the method performed by the location server, the request for the UL-SRS configuration of the target UE, the expected periodical reporting of the target UE, and the priority indication associated with the positioning requirements of the target UE are sent over a same first NRPPa message from the location server to the base station.

In one embodiment of the method performed by the location server, the request for the UL-SRS configuration of the target UE, the expected periodical reporting of the target UE, and the priority indication associated with the positioning requirements of the target UE are sent over different first NRPPa messages from the location server to the base station.

In one embodiment of the method performed by the location server, the second NRPPa message received from the base station further includes a response to provide the UL-SRS configuration of the target UE from the serving base station.

In one embodiment of the method performed by the location server, the expected periodical reporting of the target UE and the priority indication associated with the positioning requirements of the target UE are sent over a same first NRPPa message from the location server to the base station.

In one embodiment of the method performed by the location server, the expected periodical reporting of the target UE and the the priority indication associated with the positioning requirements of the target UE are sent over different first NRPPa messages from the location server to the base station.

In one embodiment of the method performed by the location server, the one or more first NRPPa messages sent to the base station further include QoS information of the target UE, which provides the priority indication associated with the positioning requirements of the target UE.

In one embodiment of the method performed by the location server, the QoS information of the target UE includes at least one of QoS latency, QoS accuracy, and QoS positioning.

According to one embodiment, the method performed by the location server further comprises sending an abort indication message to the base station to indicate a stop or a release of configured grant resources.

Corresponding embodiments of a location server that performs in UE positioning are also disclosed. In one embodiment, the location server is adapted to send one or more first NRPPa messages to a base station that serves a target UE and receive a second NRPPa message from the base station. Herein, the one or more first NRPPa messages include an expected periodical reporting of the target UE, and provide priority indication associated with positioning requirements of the target UE so as to enable the base station to configure UL grant resources. The second NRPPa message acknowledges a success or failure of the configured UL grant resources.

In one embodiment, a location server that performs in UE positioning includes an interface and processing circuitry associated with the interface. The processing circuitry is configured to cause the location server to send one or more first NRPPa messages to a base station that serves a target UE and receive a second NRPPa message from the base station. Herein, the one or more first NRPPa messages include an expected periodical reporting of the target UE, and provide priority indication associated with positioning requirements of the target UE so as to enable the base station to configure UL grant resources. The second NRPPa message acknowledges a success or failure of the configured UL grant resources.

Embodiments of a method performed by a base station, which serves a target UE, in UE positioning are also disclosed. In one embodiment, the method comprises receiving one or more first NRPPa messages from a location server and sending a second NRPPa message to the location server. Herein, the one or more first NRPPa messages include an expected periodical reporting of the target UE, and provide priority indication associated with positioning requirements of the target UE so as to enable the base station to configure UL grant resources. The second NRPPa message acknowledges a success or failure of the configured UL grant resources.

In one embodiment of the method performed by the base station, the one or more first NRPPa messages received from the location server further includes a request for UL-SRS configuration of the target UE from the base station.

In one embodiment of the method performed by the base station, the request for UL-SRS configuration of the target UE, the expected periodical reporting of the target UE, and the priority indication associated with the positioning requirements of the target UE are received over a same first NRPPa message from the location server to the base station.

In one embodiment of the method performed by the base station, the request for UL-SRS configuration of the target UE, the expected periodical reporting of the target UE, and the priority indication associated with the positioning requirements of the target UE are received over different first NRPPa messages from the location server to the base station.

In one embodiment of the method performed by the base station, the second NRPPa message sent to the location server further include a response to provide the UL-SRS configuration of the target UE to the location server.

In one embodiment of the method performed by the base station, the expected periodical reporting of the target UE and the priority indication associated with the positioning requirements of the target UE are received over a same first NRPPa message from the location server to the base station.

In one embodiment of the method performed by the base station, the expected periodical reporting of the target UE and priority indication associated with the positioning requirements of the target UE are received over different first NRPPa messages from the location server to the base station.

In one embodiment of the method performed by the base station, the one or more first NRPPa messages received from the local server further include QoS information of the target UE, which provides the priority indication associated with the positioning requirements of the target UE.

In one embodiment of the method performed by the base station, the QoS information for the target UE includes at least one of QoS latency, QoS accuracy, and QoS positioning.

In one embodiment of the method performed by the base station, the base station includes a next generation Node B central unit (gNB-CU) and a gNB distributed-unit (gNB-DU). The gNB-CU considers the expected periodical reporting and the priority indication associated with the positioning requirements of the target UE to adapt preconfigured UL transmissions for the target UE with periodicity of the positioning reporting. In addition, the gNB-CU transmits the expected periodical reporting and the priority indication associated with the positioning requirements of the target UE to the gNB-DU.

According to one embodiment, the method performed by the base station further comprises receiving an abort indication message from the location server. The abort indication message indicates a stop or a release of configured grant resources.

According to one embodiment, the method performed by the base station further comprises prioritizing among different UEs in allocation of UL grant resources based upon the priority indication associated with the positioning requirements of the target UE received from the location server.

According to one embodiment, the method performed by the base station further comprises configuring UL grant resources for the target UE by considering the expected UE periodical reporting and the priority indication associated with the positioning requirements of the target UE received from the location server.

According to one embodiment, the method performed by the base station further comprises determining to release or abort configured UL grant resources based upon received abort indication message.

According to one embodiment, the method performed by the base station further comprises releasing the configured UL grant resources to the target UE.

Corresponding embodiments of a base station, which serves a target UE, performing in UE positioning are also disclosed. In one embodiment, the base station is adapted to receive one or more first NRPPa messages from a location server and send a second NRPPa message to the location server. Herein, the one or more first NRPPa messages include an expected periodical reporting of the target UE, and provide priority indication associated with the positioning requirements of the target UE so as to enable the base station to configure UL grant resources. The second NRPPa message acknowledges a success or failure of the configured UL grant resources.

In one embodiment, a base station, which serves a target UE, performing in UE positioning includes an interface and processing circuitry associated with the interface. The processing circuitry is configured to cause the base station to receive one or more first NRPPa messages from a location server and send a second NRPPa message to the location server. Herein, the one or more first NRPPa messages include an expected periodical reporting of the target UE, and priority indication associated with the positioning requirements of the target UE so as to enable the base station to configure UL grant resources. The second NRPPa message acknowledges a success or failure of the configured UL grant resources.

Embodiments of a method performed by a UE in UE positioning, which is served by a base station, are also disclosed. In one embodiment, the method comprises obtaining UL grant resources configured by the base station and providing measurements to a location server using the configured UL grant resources. Herein, the UL grant resources are configured by the base station based upon expected UE periodical reporting and priority indication associated with the positioning requirements of the UE received by the base station from the location server.

Corresponding embodiments of a UE performing in UE positioning, which is served by a base station, are also disclosed. In one embodiment, the UE is adapted to obtain UL grant resources configured by the base station and provide measurements to a location server using the configured UL grant resources. Herein, the UL grant resources are configured by the base station based upon expected UE periodical reporting and priority indication associated with the positioning requirements of the UE received by the base station from the location server.

In one embodiment, a UE performing in UE positioning, which is served by a base station, includes one or more transmitters, one or more receivers, and processing circuitry associated with the one or more transmitters and the one or more receivers. The processing circuitry is configured to cause the UE to obtain UL grant resources configured by the base station and provide measurements to a location server using the configured UL grant resources. Herein, the UL grant resources are configured by the base station based upon expected UE periodical reporting and priority indication associated with the positioning requirements of the UE received by the base station from the location server.

Certain embodiments may provide one or more of the following technical advantage(s). For example, embodiments of the present disclosure may provide any one or more of the following advantages:

- aligning NRPPa with LPP in periodic time transmissions so that the base station has more information for coordinating the UE UL grants with the positioning transmissions;
- avoiding clashes with other preconfigured UL transmissions time intervals of the UE;
- providing the resources upfront (at the right instance) for the UE to report its measurement can minimize the overall positioning procedure delay;
- releasing configured grant resources efficiently; and
- increasing the positioning accuracy and reduce the network's latency.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
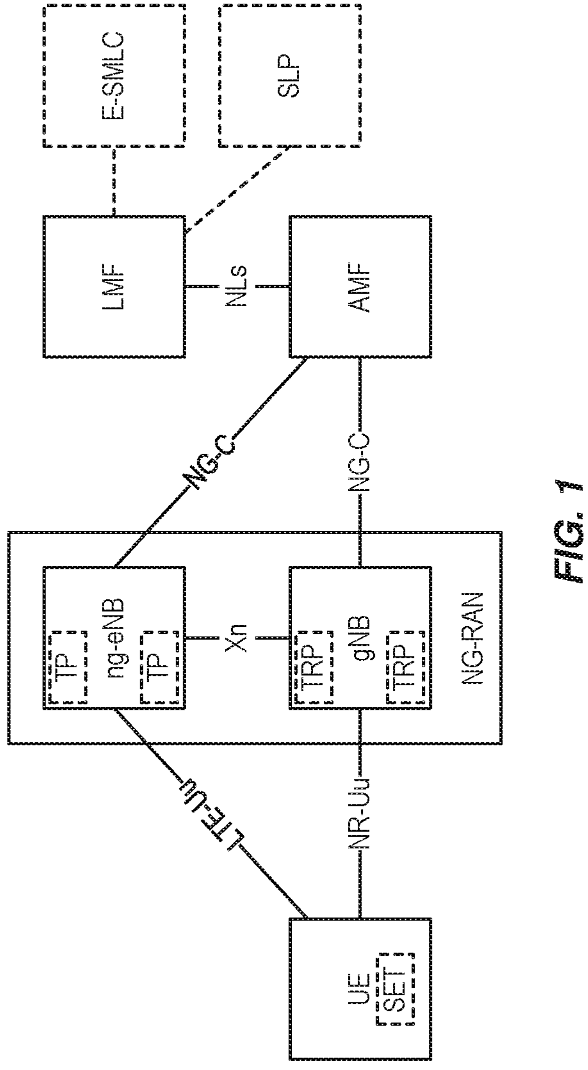
FIG. 1 illustrates a typical positioning architecture in NR in Third Generation Partnership Project (3GPP) New Radio (NR).

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In configuration of uplink (UL) grant with positioning periodical reporting, there currently exist certain challenge (s). Although, a Long Term Evolution Positioning Protocol (LPP) configures the User Equipment (UE) measurement reporting periodicity for location information reporting, this is not known to a base station (e.g., gNB). Because of this, the gNB may not be able to configure the UL grant matching the UE reporting periodicity.

Figure 2:
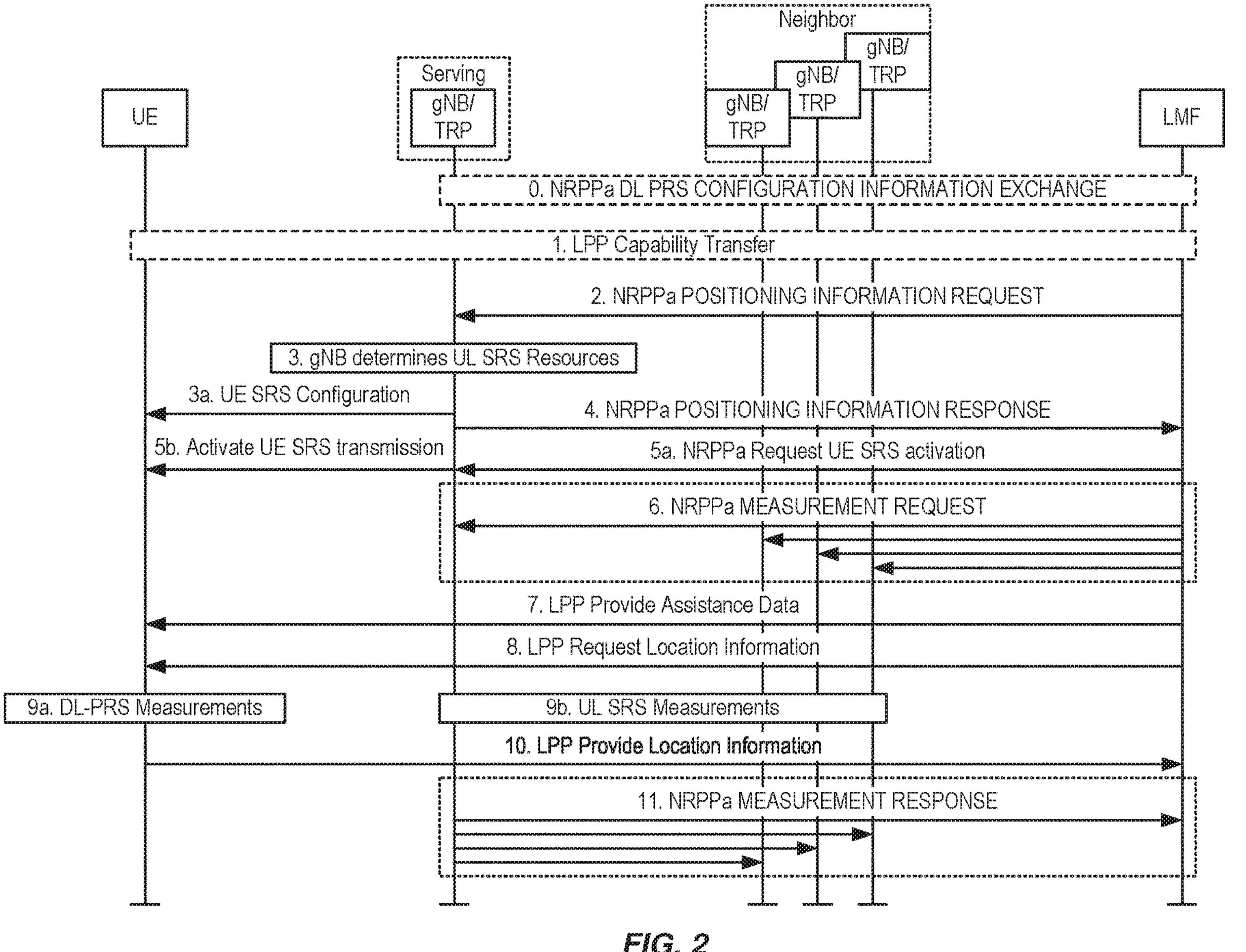
FIG. 2 illustrates a typical flow-chart for multi-Round Trip Time (RTT) positioning.

To transmit on the Physical Uplink Shared Channel (PUSCH), a valid UL grant must have been pre-allocated by the gNB to the UE. Currently, the gNB does not know what is the periodical LPP reporting in Steps 8 or 10 of FIG. 2, for which the UE may provide periodic location information to the LMF. The gNB knows instead whether the NRPPa measurements response in Step 11 above should be sent at once (on demand) or in many messages (Periodic NRPP reporting), but the gNB cannot know the UE's windows of reporting information to the LMF via LPP. This is particularly significant for positioning methods such as Downlink Time Difference of Arrival (DL-TDOA) that do not require such gNB/LMF information exchange. Therefore, the absence of such sync of UL information at gNB can prohibit in configuring UL grant properly and consequently delay signaling and impact the overall network's latency. Further, the positioning periodical reporting performed by the UE via LPP should not clash with other UL transmissions that have been configured by the gNB when the UE is in connected mode (e.g., in Range Rate Correction (RRC)).

In addition, when the LMF provides the Downlink Positioning Reference Signal (DL-PRS) Assistance data (AD), it provides a prioritized list of cells/TRPs where the UE should perform the measurement and report to the LMF via LPP. In LTE, a list of 32 cells is provided. For DL-TDOA, 3 Reference Signal Time Differences (RSTDs) could be adequate if rich reporting/Line of Sight (LOS) is available; similarly, for multi-Round Trip Time (RTT), up to 2 neighbor TRPs measurement can be enough to compute the location. However, the LMF as such provides several cells/TRPs list to the UE because the measurements obtained from only few cells/TRPs at times may not be enough to compute the position mainly if those are Non-Line of Sight (NLOS) and the UE has large uncertainty. It may take lots of UE power to compute the positioning, and to provide measurement results for several cells is time consuming, increases signaling load, and requires large radio resources.

On the other hand, positioning Quality of Service (QoS) as such is defined in terms of positioning accuracy and latency. The positioning QoS provides priority indication associated with positioning requirements (more details are disclosed in tables below). Some of the applications require high positioning accuracy along with faster response time (non-delay tolerant positioning application such as for autonomous driving). While some of the applications can be delay tolerant and occasional tracking with low positioning accuracy can be enough (for example tracking goods/objects whether they are still located in factory or are on the move). Depending upon the QoS need (e.g., positioning requirements), different policies can be adopted in the gNB. Larger resources can be guaranteed for non-delay tolerant applications compared to delay tolerant applications as an example. However, conventionally, the gNB is not aware of the QoS for positioning.

Figure 3A:
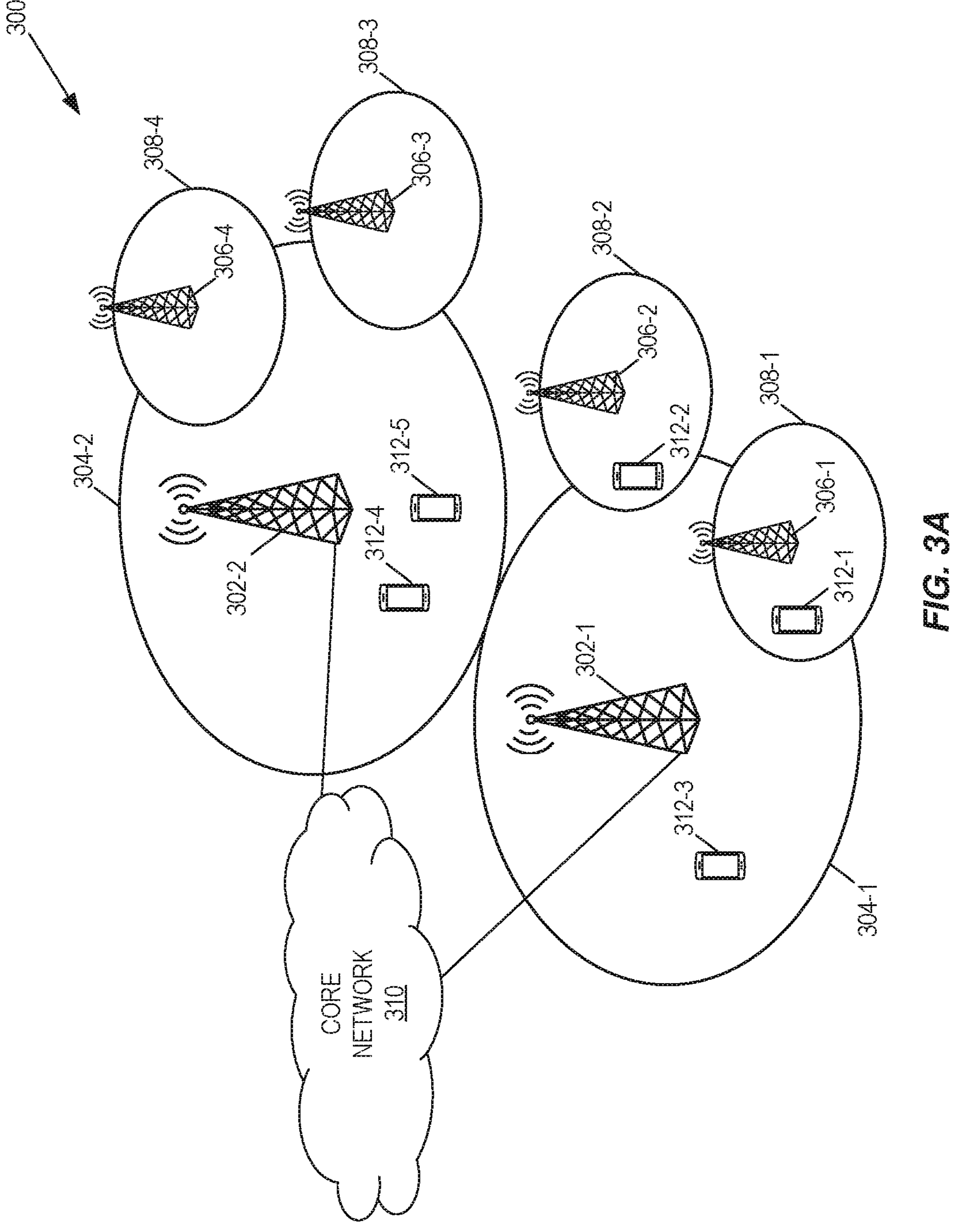
FIGS. 3A-3B illustrate one example of a cellular communications system in which embodiments of the present disclosure may be implemented.

FIG. 3A illustrates one example of a cellular communications system 300 in which embodiments of the present disclosure may be implemented. In the embodiments described herein, the cellular communications system 300 is a 5G system (5GS) including a Next Generation RAN (NG-RAN) and a 5G Core (5GC). In this example, the RAN includes base stations 302-1 and 302-2, which in the 5GS include NR base stations (gNBs) and optionally next generation eNBs (ng-eNBs) (e.g., LTE RAN nodes connected to the 5GC), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5G System (5GS) is referred to as the 5GC. The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Figure 3B:
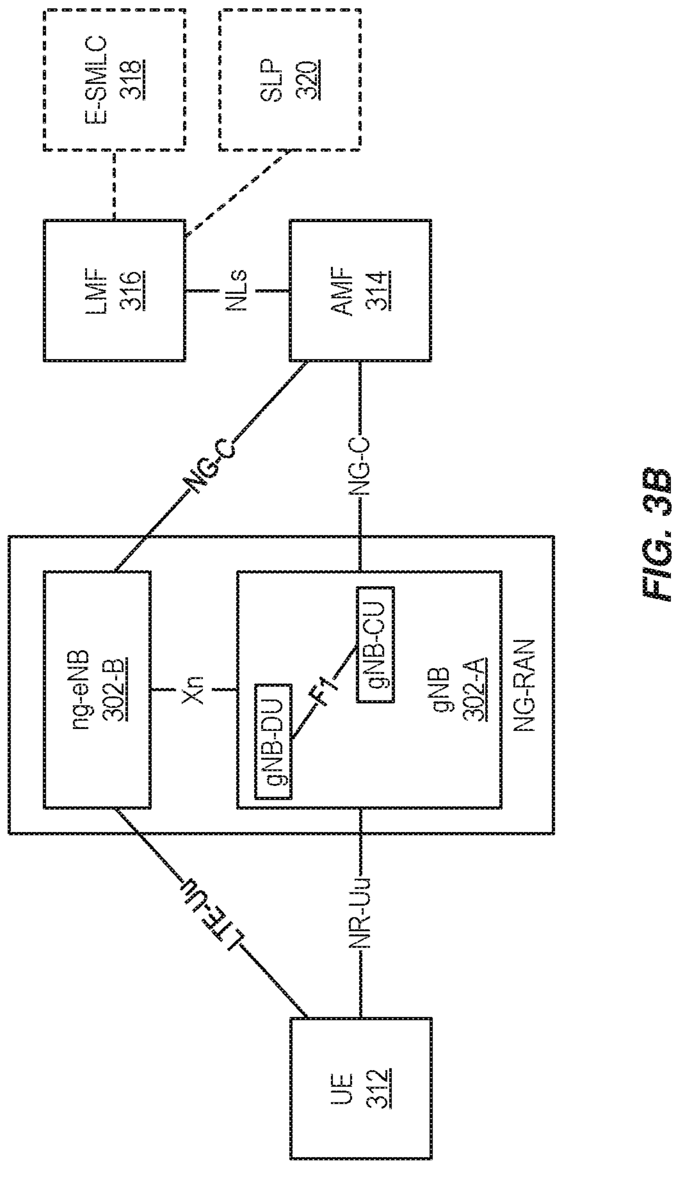

In the preferred embodiments described herein, for positioning purposes, the cellular communications system 300 has the network architecture described above with respect to FIG. 1. This is illustrated in FIG. 3B. More specifically, as illustrated in FIG. 3B, for location purposes, the core network 310 includes an AMF 314, a LMF 316, optionally an Evolved Serving Mobile Location Center (E-SMLC) 318, and optionally a Secure User Plane Location (SUPL) Location Platform (SLP) 320. Note that, with respect to the network functions (NFs) within the 5GC (e.g., AMF 314, LMF 316, etc.), these NFs may be implemented as, e.g., a network element on a dedicated hardware, as a software instance running on a dedicated hardware, or as a virtualized function instantiated on an appropriate platform, e.g., a cloud infrastructure. Furthermore, the NG-RAN network includes gNB(s) 302-A and optionally ng-eNB(s) 302-B. In some cases, the gNB(s) may have a split architecture including gNB-CU and gNB-DU, and these two are connected by an interface called F1 (refer to TS 38.473).

In current existing RAN design, the gNB is not aware of QoS needed for positioning. However, since the LPP is carried over control plane, such control plane then has a higher priority than user plane. In some applications, the gNB needs to serve multiple UEs who require positioning solutions with different methods and QoS requirements. In such case, if the gNB is aware of QoS for positioning then the gNB can prioritize the control plane resources among these multiple UEs. Therefore, it is desired that the LMF provides QoS (e.g., priority indication associated with positioning requirements) for each UE to the gNB.

Figure 4A:
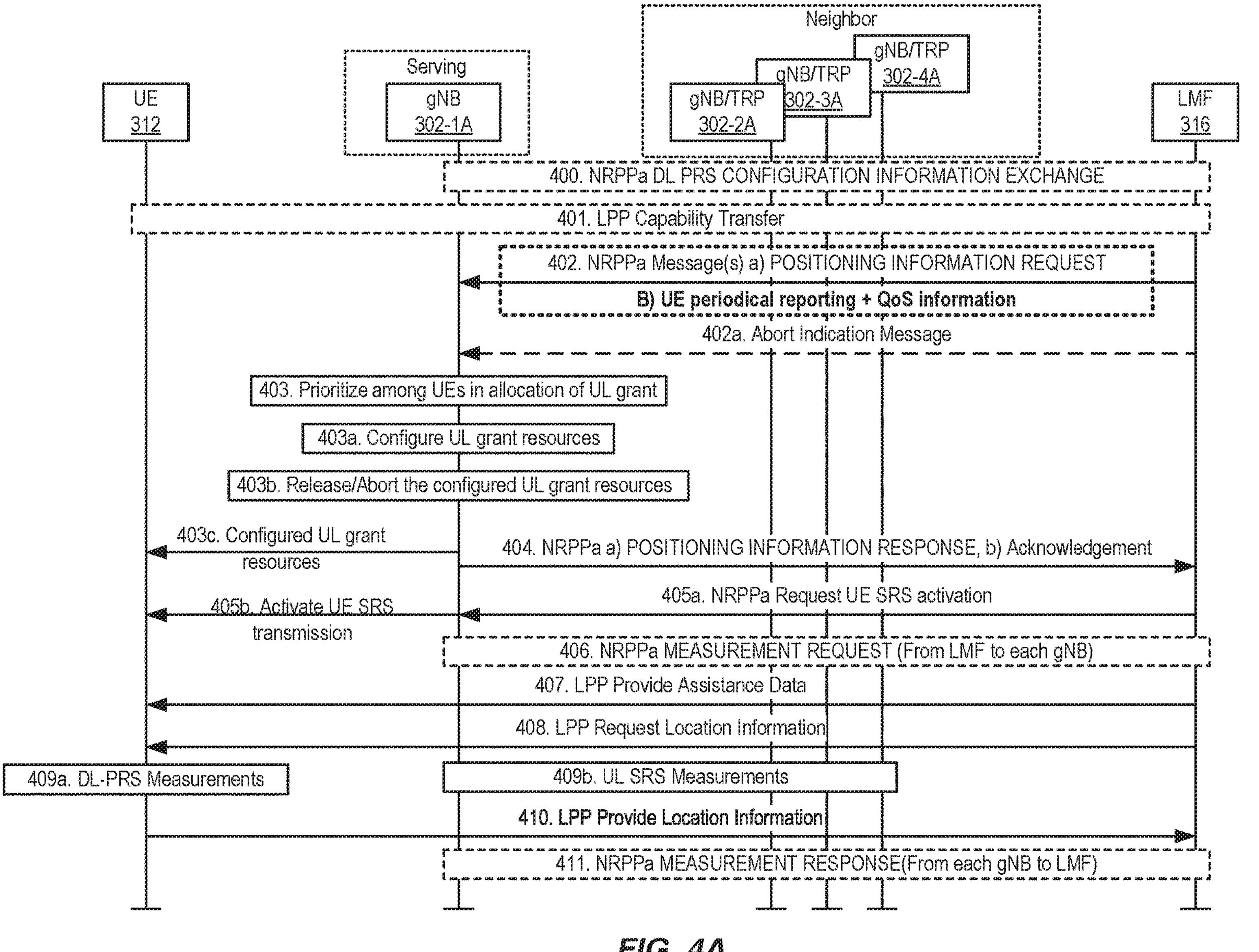
FIGS. 4A and 4B illustrate a flow-chart of signaling exchange for positioning among various nodes in accordance with embodiments of the present disclosure.

FIG. 4A illustrates an example of signaling exchange for positioning among various nodes when the LMF 316 is the entity that performs positioning estimation in accordance with one embodiment of the present disclosure. The steps of the procedure illustrated in FIG. 4 are as follows:

Step 400: performing NRPPa DL-PRS configuration information exchange between the LMF 316 and the gNBs, such as a serving gNB 302-1A and/or neighbor gNBs 302-2A, 302-3A, and 302-4A. Herein, the serving gNB 302-1A is a currently serving base station of a target UE 312.

The LMF 316 determines that certain TRP configuration is desired (e.g., as part of a periodic update or as triggered by Operations, Administration and Maintenance (OAM)) and sends an NRPPa TRP INFORMATION REQUEST message to the gNB(s) (the serving gNB 302-1A and/or neighbor gNBs 302-2A, 302-3A, and 302-4A). This request includes an indication of which specific TRP configuration information is requested.

The gNB(s) provides the requested TRP information in an NRPPa TRP INFORMATION RESPONSE message, if available at the gNB(s). If the gNB(s) is not able to provide any information, it returns a TRP INFORMATION FAILURE message indicating the cause of the failure.

Step 401: performing LPP capability transfer between the LMF 316 and the target UE 312.

The LMF 316 may send a request for the LPP related capabilities of the UE 312.

The UE 312 transfers its LPP-related capabilities to the LMF 316. The capabilities may refer to particular position methods or may be common to multiple position methods.

Step 402: The LMF 316 sends one or more NRPPa messages to the serving gNB 302-1A for positioning information. The NRPPa message(s) includes a POSITIONING INFORMATION REQUEST to request uplink (UL) information (UL Sounding Reference Signal (UL-SRS) configuration information) of the target UE 312 from the serving gNB 302-1A. Herein, the POSITIONING INFORMATION REQUEST is an exemplary request for the UL-SRS configuration information of the target UE 312. In different applications, the NRPPa message(s) may include different request(s) for the UL-SRS configuration information of the target UE 312. Also, the NRPPa message(s) includes an expected periodical reporting of the UE 312 and QoS information for the UE 312. Herein the QoS information at least provides priority indication associated with positioning requirements of the UE 312.

The LMF 316 may send the POSITIONING INFORMATION REQUEST, the expected UE periodical reporting, and the QoS information over a same NRPPa message or different NRPPa messages. For instance, when the LMF 316 sends the POSITIONING INFORMATION REQUEST to the serving gNB 302-1A, the LMF 316, in the same NRPPa message, can also request the serving gNB 302-1A to consider the UE periodical reporting, with its subfields as defined in TS 37.355, and a desired level of QoS. In another example, the LMF 316 may send a first NRPPa message including the POSITIONING INFORMATION REQUEST to the serving gNB 302-1A; and the LMF 316 sends a second NRPPa message including the expected periodical reporting of the UE 312 and QoS information for the UE 312. In addition, when the serving gNB 302-1A receives the UE periodical reporting and level of QoS, the serving gNB 302-1A will take them into account to configure the periodicity of UE's UL grant(s) accordingly.

In case of a split gNB architecture, the gNB-CU in the serving gNB 302-1A will take into account the received UE periodical reporting and QoS information to adapt the UE preconfigured UL transmissions with the positioning reporting periodicity. The gNB-CU in the serving gNB 302-1A can also provide the expected periodical reporting and the QoS information to the gNB-DU the serving gNB 302-1A over the F1 interface in case some UE UL grants need to be configured via PHY/MAC layer.

In another embodiment, when the LMF 316 has been able to compute positioning without having the need of all the measurement reports from the UE 312, the LMF 316 may send an abort indication message to the serving gNB 302-1A to indicate the stop or the release of configured grant resources (Step 402*a*). If the serving gNB 302-1A has a split gNB architecture, the gNB-CU will also send the abort indication to the gNB-DU.

Non-limiting examples for NRPPa signaling, which is sent from the LMF 316 to the serving gNB 302-1A to request positioning information, are presented below.

| IE/Group Name | Presence | IE type and reference | Semantics description | Criticality | Assigned Criticality |
|---|---|---|---|---|---|
| Message Type | M | 9.2.3 | | YES | reject |
| NRPPa Transaction ID | M | 9.2.4 | | — | |
| Requested SRS Transmission Characteristics | O | 9.2.27 | | YES | ignore |
| UE reporting periodicity | O | OCTET STRING Or Enumerated {ri0-25, ri0-5, ri1, ri2, ri4, ri8, ri16, ri32, ri64} | As defined in TS 37.355 | YES | ignore |
| QoS Latency | O | INTEGER (1 . . . 5) | Value 1 indicates highest priority and value 5 means the lowest priority | YES | ignore |
| QoS Accuracy | O | INTEGER (1 . . . 5) | Value 1 indicates highest priority and value 5 means the lowest priority | YES | ignore |
| QoS Positioning | O | INTEGER (1 . . . 5) | Value 1 indicates highest priority and value 5 means the lowest priority | YES | ignore |

-continued

| IE/Group Name | Presence | IE type and reference | Semantics description | Criticality | Assigned Criticality |
|---|---|---|---|---|---|
| Abort indication | O | ENUMERATED (true, false, . . .) | Value true indicates aborting the allocated UE resources, and value false means continue | YES | ignore |

Non-limiting examples for F1 Application Protocol (F1AP) signaling, which is sent by the gNB-CU to indicate to the gNB-DU the need to configure the UE 312 to transmit SRS signals for UL positioning measurement, are presented below.

| IE/Group Name | Presence | IE type and reference | Semantics description | Criticality | Assigned Criticality |
|---|---|---|---|---|---|
| Message Type | M | 9.3.1.1 | | YES | reject |
| gNB-CU UE F1AP ID | M | 9.3.1.4 | | YES | reject |
| gNB-DU UE F1AP ID | M | 9.3.1.5 | | YES | reject |
| Requested SRS Transmission Characteristics | O | 9.3.1.175 | | YES | ignore |
| UE reporting periodicity | O | OCTET STRING Or Enumerated {ri0-25, ri0-5, ri1, ri2, ri4, ri8, ri16, ri32, ri64} | As defined in TS 37.355 | YES | ignore |
| QoS Latency | O | INTEGER (1 . . . 5) | Value 1 indicates highest priority and value 5 means the lowest priority | YES | ignore |
| QoS Accuracy | O | INTEGER (1 . . . 5) | Value 1 indicates highest priority and value 5 means the lowest priority | YES | ignore |
| QoS Positioning | O | INTEGER (1 . . . 5) | Value 1 indicates highest priority and value 5 means the lowest priority | YES | ignore |
| Abort indication | O | ENUMERATED (true, false, . . .) | Value true indicates aborting the allocated UE resources, and value false means continue | YES | ignore |

a NRPPa POSITIONING INFORMATION RESPONSE message. Herein, the POSITIONING INFORMATION RESPONSE is an exemplary response to provide the UL-SRS configuration information of the UE 312 to the LMF 316. In different applications, there might be other NRPPa The above embodiments are valid for all positioning methods, provided that the UE supports periodical LPP reporting and has communicated its capability before-hand to the LMF. For other positioning methods, such as DL-TDOA, a new NRPPa signaling can be used to send the UE expected periodical reporting and QoS latency to the gNB.

Step 403: the serving gNB 302-1A prioritizes among different UEs (including the target UE 312) in allocation of UL grants based upon the received QoS information. Also, the serving gNB 302-1A configures UL grant resources for the target UE 312 by considering the expected UE periodical reporting and the QoS information (Step 403*a*). Furthermore, if the serving gNB 302-1A receives the abort indication message from the LMF 316, the serving gNB 302-1A may release or abort configured UL grant resources based upon received abort indication message (Step 403*b*). At Step 403*c*, the serving gNB 302-1A may release the configured UL grant resources to the target UE 312.

Step 404: The serving gNB 302-1A provides the UL-SRS configuration information of the UE 312 to the LMF 316 in response message(s) to provide the UL-SRS configuration information of the UE 312 to the LMF 316. The serving gNB 302-1A may also provide an acknowledgement of the configured UL grants (success or failure) to the LMF 316 via the NRPPa message. This acknowledgement can be encapsulated in the NRPPa message. NOTE: It is up to implementation on whether SRS configuration is provided earlier than DL-PRS configuration.

Step 405*a*: The LMF 316 may send a NRPPa SRS Activation Request message to the serving gNB 302-1A of the target UE 112 to request activation of UE SRS transmission. For a semi-persistent UL-SRS, the message includes an indication of an UL-SRS resource set to be activated and may include information that indicates the spatial relation for the semi-persistent UL-SRS resource to be activated. At Step 405*b*, the serving gNB 302-1A then activates the UE SRS transmission. The UE 312 begins the UL-SRS transmission according to the time domain behavior of UL-SRS resource configuration.

Step 406: The LMF 316 sends a NRPPa MEASUREMENT REQUEST message to selected gNBs (one or more of the serving gNB 302-1A and the neighbor gNBs 302-2A, 302-3A, and 302-4A) to request Multi-RTT measurement information. This NRPPa message includes any information required for the selected gNBs to perform the measurements Step 407: The LMF 316 determines that assistance data needs to be provided to the UE 312 (e.g., as part of a positioning procedure) and sends an LPP Provide Assistance Data message to the UE 312. Such message includes any required assistance data for the UE 312 to perform the necessary DL-PRS measurements.

Step 408: The LMF 316 sends a LPP Request Location Information message to the UE 312 to request Multi-RTT measurements.

Step 409*a*: The UE 312 performs the DL-PRS measurements from all gNBs (both serving and neighbor gNBs) provided in the assistance data at Step 407. In Step 409*b*, each gNB configured at Step 406 measures the UE SRS transmissions from the UE 312.

Step 410: The UE 312 reports the DL-PRS measurements for Multi-RTT to the LMF 316 in a LPP Provide Location Information message using the configured grant resources.

Step 411: Each gNB (each of the serving gNB 302-1A and the neighbor gNBs 302-2A, 302-3A, and 302-4A) reports the UE SRS measurements to the LMF 316 in a NRPPa Measurement Response message. The LMF 316 then determines the RTTs from the UE and gNB Rx-Tx time difference measurements for each gNB for which corresponding UL and DL measurements were provided at Steps 410 and 411 and calculates the position of the UE 312.

Figure 4B:
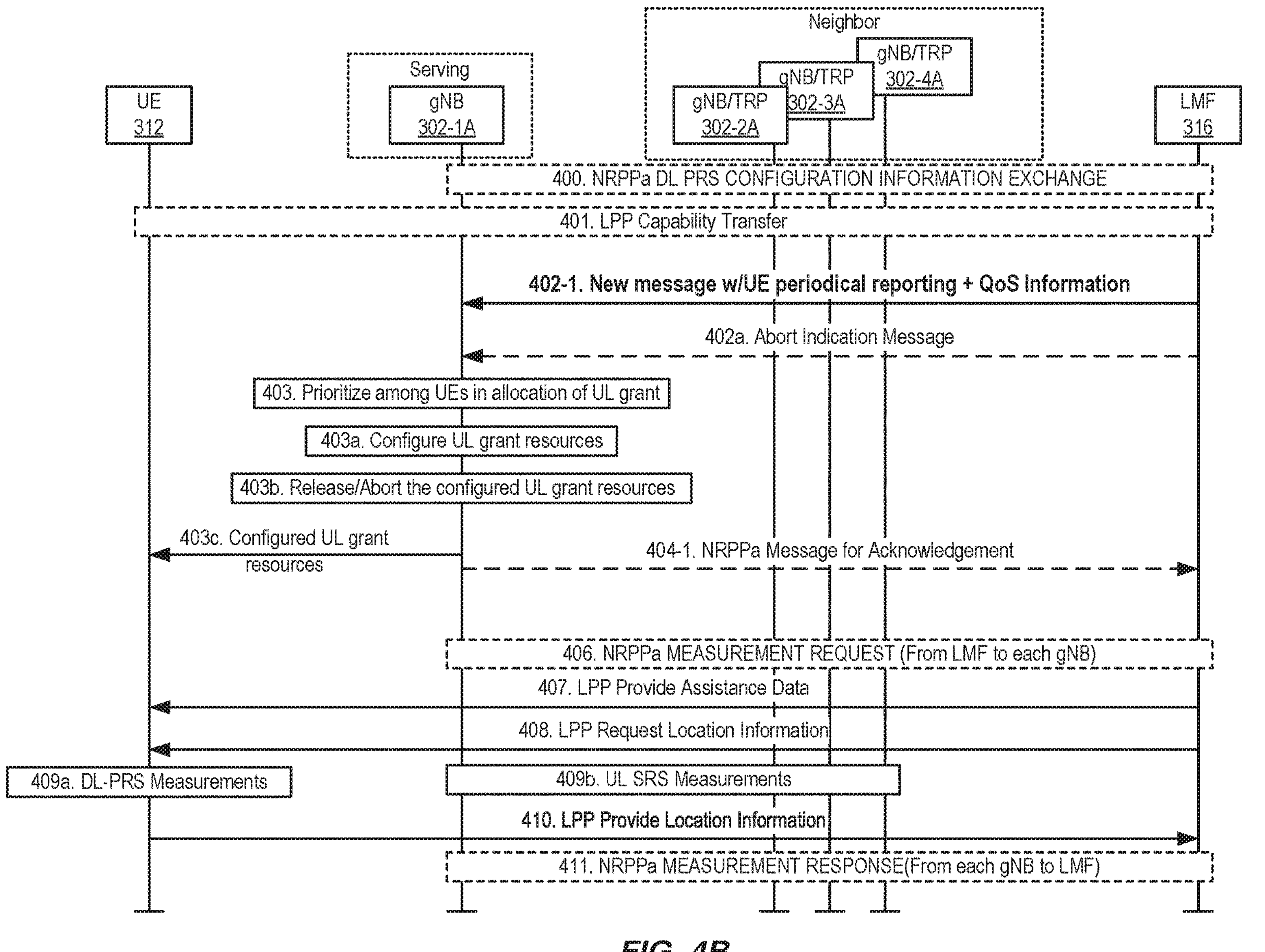

For positioning methods that do not call for gNB/LMF exchanges besides the Step 400 in FIG. 4A (Steps 402, 404, 405*a* and 405*b* can be omitted), an individual new message from the LMF 316 to the serving gNB 302-1A is needed before-hand to transmit the expected periodical reporting of the UE 312 and QoS information for the UE 312 (Step 402-1), as illustrated in FIG. 4B. This new message allows the serving gNB 302-1A to properly configure the UE 312 reporting and align them with UL configured grants. In addition, the serving gNB 302-1A may provide an acknowledgement of the configured UL grants (success or failure) to the LMF 312 via NRPPa. This acknowledgement can be provided in a new NRPPa message (Step 404-1).

Figure 5:
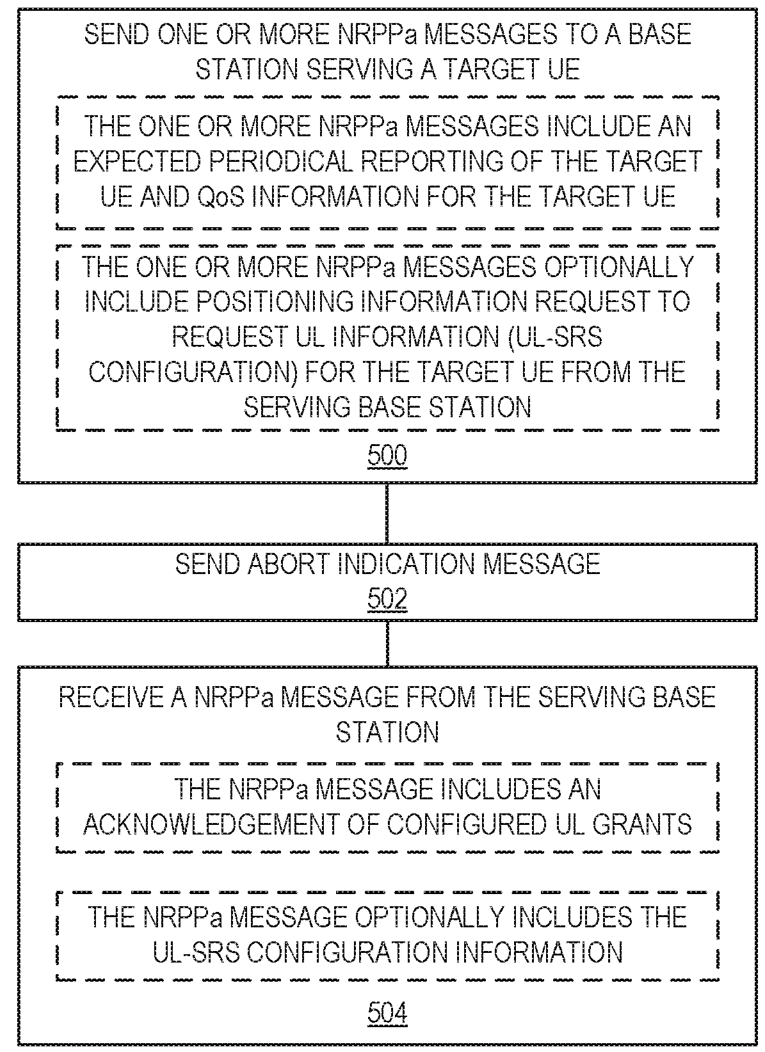
FIG. 5 illustrates operations of a location server in the signaling exchange for positioning in accordance with some embodiments of the present disclosure.

FIG. 5 is a flow chart that illustrates the operations of a location server (e.g., LMF 316) in accordance with some embodiments of the present disclosure. Note that while this process is described for the location server, this process is more generally applicable to any position estimation entity. As illustrated, the location server sends one or more NRPPa messages to a base station (e.g. serving gNB 302-1A) serving a target UE (e.g. the UE 312) (Step 500). As discussed above, the one or more NRPPa messages include an expected periodical reporting of the target UE and QoS information (e.g. QoS desired level) for the target UE. In some applications, the one or more NRPPa messages may also include a POSITIONING INFORMATION REQUEST to request UL information (UL-SRS configuration) of the target UE from the serving base station. The location server may send the POSITIONING INFORMATION REQUEST, the expected UE periodical reporting, and the QoS information over a same NRPPa message or different NRPPa messages. Herein, the POSITIONING INFORMATION REQUEST is an exemplary request for the UL-SRS configuration information of the target UE. In different applications, the one or more NRPPa messages may include different request(s) for the UL-SRS configuration information of the target UE.

The location server may also send an abort indication message to the base station to indicate the stop or the release of configured grant resources for the target UE (Step 502).

The location server then receives a NRPPa message from the serving base station (Step 504). This received NRPPa message includes an acknowledgement of configured UL grants (success or failure). If this received NRPPa message responds to the POSITIONING INFORMATION REQUEST sent by the location server, this received NRPPa message may be a POSITIONING INFORMATION RESPONSE message (as illustrated in Step 404 in FIG. 4A) and may provide the UL-SRS configuration information. In some applications, the location server does not need UL SRS configuration. The location server only sends the UE's expected periodical reporting and the QoS information to the base station, which will take them into account. No feedback from the base station to the location server is needed.

Figure 6:
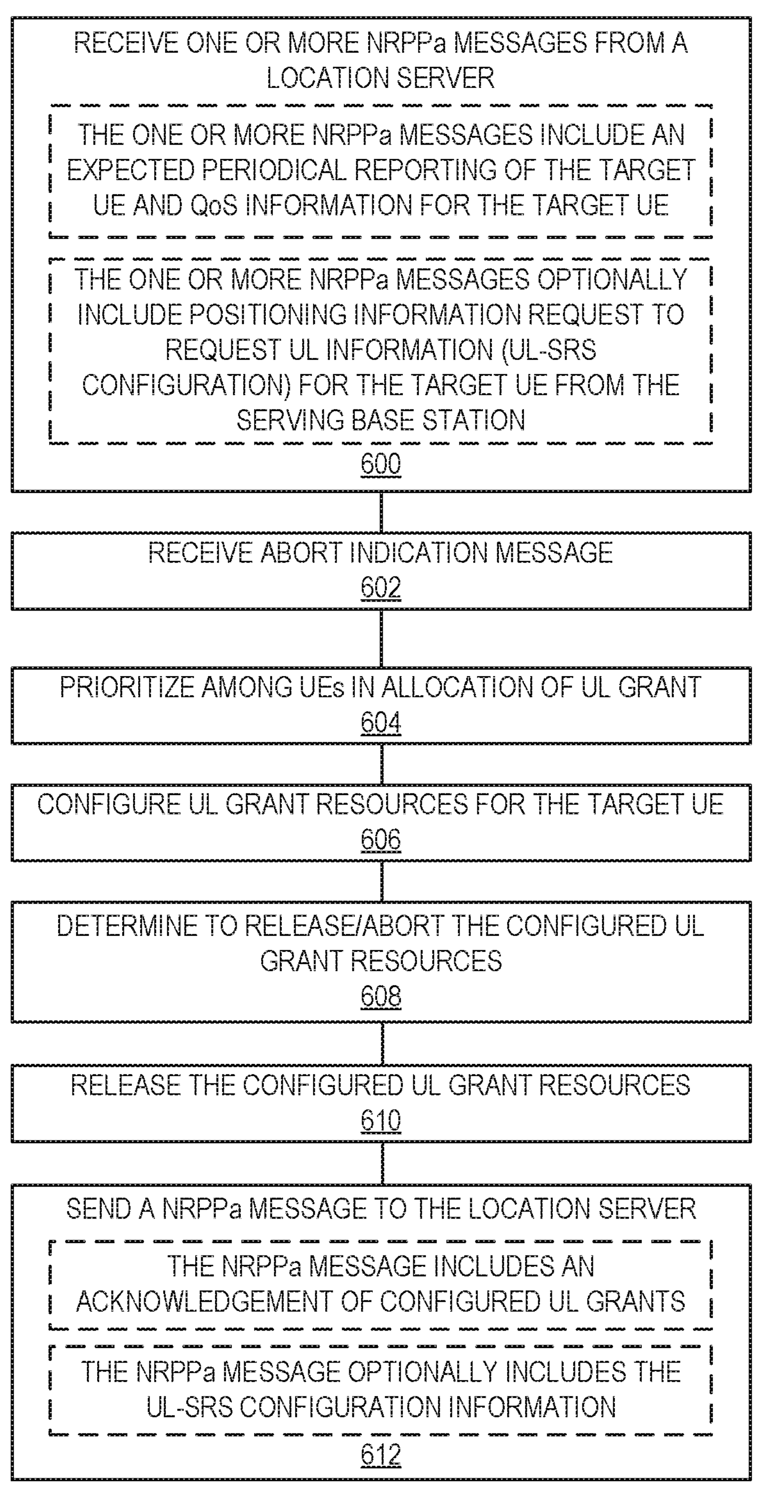
FIG. 6 illustrates operations of a base station in the signaling exchange for positioning in accordance with some embodiments of the present disclosure.

FIG. 6 is a flow chart that illustrates the operations of a base station (e.g., serving gNB 302-1A) serving a target UE (e.g., the UE 312) in accordance with some embodiments of the present disclosure. As illustrated, the base station receives one or more NRPPa messages from a location server (Step 600). As discussed above, the one or more NRPPa messages include an expected periodical reporting of the target UE and QoS information (e.g. QoS desired level) for the target UE. In some applications, the one or more NRPPa messages may also include a POSITIONING INFORMATION REQUEST to request UL information (UL-SRS configuration) of the target UE from the base station. The base station may receive the POSITIONING INFORMATION REQUEST, the expected UE periodical reporting, and the QoS information in a same NRPPa message or different NRPPa messages. Herein, the POSITIONING INFORMATION REQUEST is an exemplary request for the UL-SRS configuration information of the target UE. In different applications, the one or more NRPPa messages may include different request(s) for the UL-SRS configuration information of the target UE.

In addition, the base station may also receive an abort indication message from the location server to indicate the stop or the release of configured grant resources for the target UE (Step 602).

Next, the base station may prioritize among different UEs (including the target UE 312) in allocation of UL grants based upon the received QoS information (Step 604). Also, the base station configures UL grant resources for the target UE by considering the expected UE periodical reporting and the QoS information (Step 606). Furthermore, if the base station receives the abort indication message from the location server, the base station may determine to release or abort configured UL grant resources based upon received abort indication message (Step 608). At Step 610, the base station may release the configured UL grant resources to the target UE.

The base station sends a NRPPa message to the location server (Step 612). If this NRPPa message sent by the base station responds to the received POSITIONING INFORMATION REQUEST from the location server, this NRPPa message may be a POSITIONING INFORMATION RESPONSE message (as illustrated in Step 404 in FIG. 4A) and may provide the UL-SRS configuration information. In some applications, the location server does not need UL SRS configuration. The location server only sends the UE's expected periodical reporting and the QoS information to the base station, which will take them into account. No feedback from the base station to the location server is needed.

Figure 7:
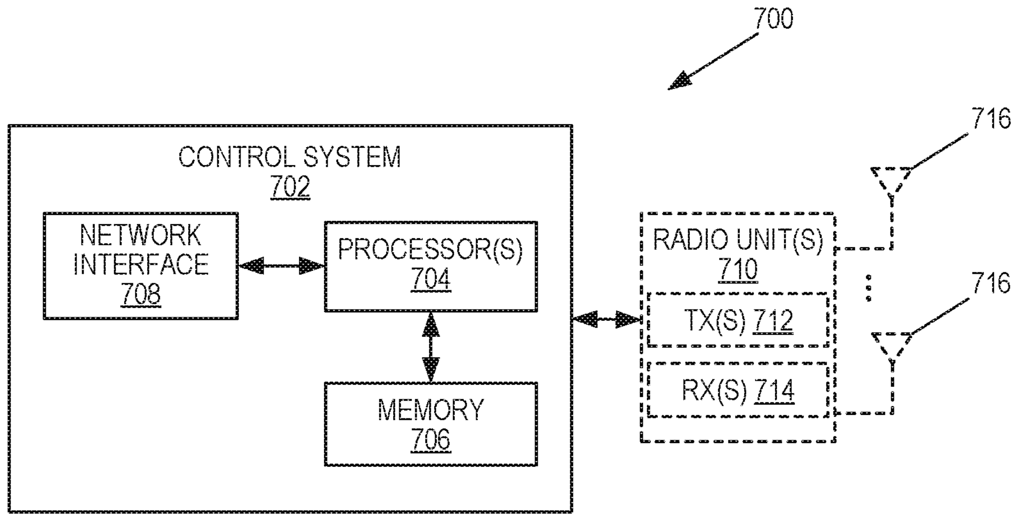
FIGS. 7, 8, and 9 are schematic block diagrams of example embodiments of a network node, in which embodiments of the present disclosure may be implemented.

FIG. 7 is a schematic block diagram of a network node 700 (e.g., a base station 302, a network node that implements some or all of the functionality of a base station described herein, or a network node on which a LMF 316 or location server is implemented) according to some embodiments of the present disclosure. Optional features are represented by dashed boxes. As illustrated, the network node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. In addition, the network node 700 may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a network node 700 as described herein (e.g., one or more functions of a base station, LMF, or location server described herein). In some embodiments, the function(s) are implemented in software that is stored, e.g., in the memory 706 and executed by the one or more processors 704.

Figure 8:
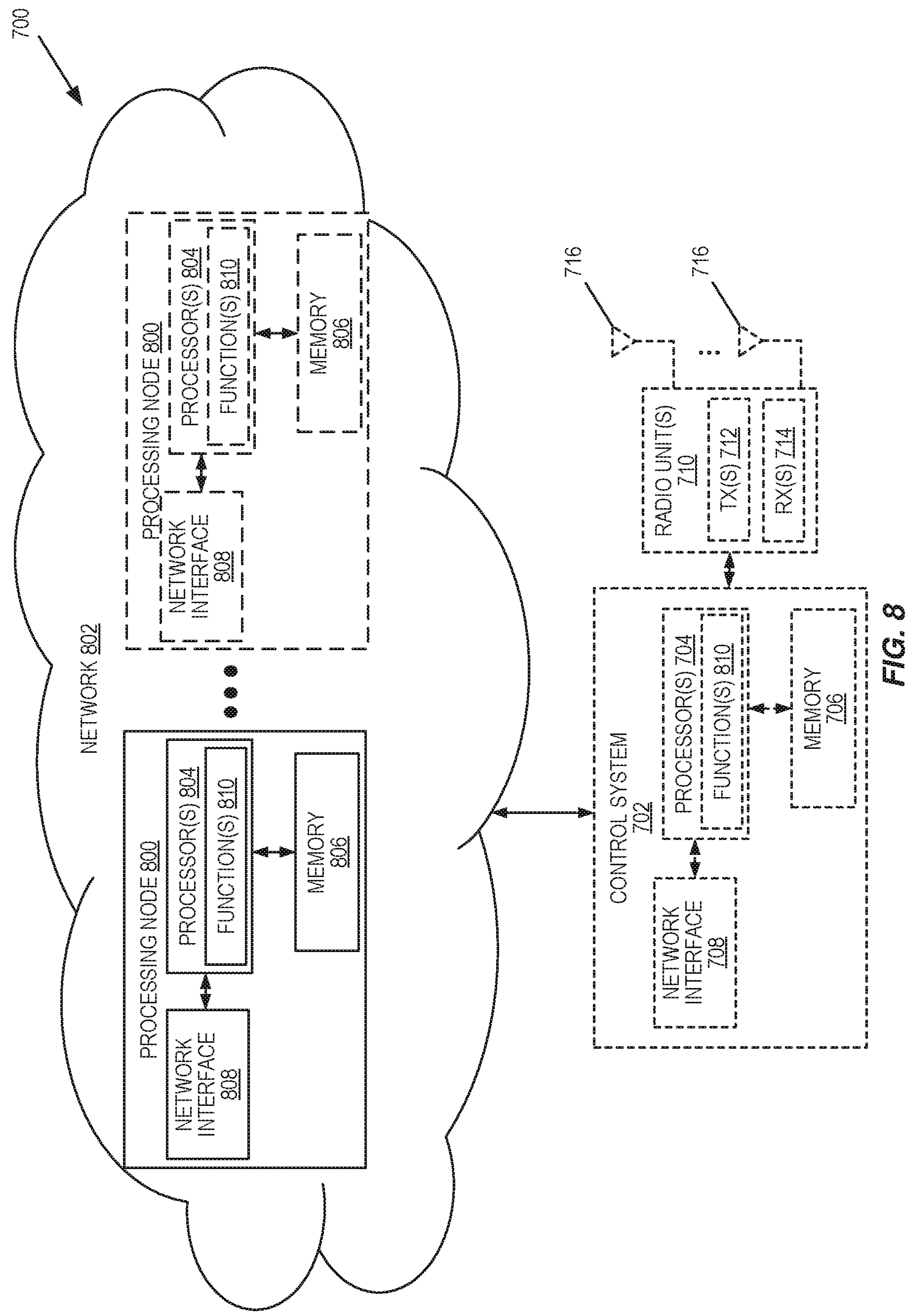

FIG. 8 is a schematic block diagram that illustrates a virtualized embodiment of the network node 700 according to some embodiments of the present disclosure. This discussion is equally applicable to other types of network nodes. Further, other types of network nodes may have similar virtualized architectures.

As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 may include the control system 702 and/or the one or more radio units 710, as described above. The control system 702 may be connected to the radio unit(s) 710 via, for example, an optical cable or the like. The network node 700 includes one or more processing nodes 800 coupled to or included as part of a network(s) 802. If present, the control system 702 or the radio unit(s) are connected to the processing node(s) 800 via the network 802. Each processing node 800 includes one or more processors 804 (e.g., CPUs, ASICs, FPGAs, and/or the like), memory 806, and a network interface 808.

In this example, functions 810 of the network node 700 described herein (e.g., one or more functions of a base station, LMF, or location server described herein) are implemented at the one or more processing nodes 800 or distributed across the one or more processing nodes 800 and the control system 702 and/or the radio unit(s) 710 in any desired manner. In some particular embodiments, some or all of the functions 810 of the network node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicates directly with the processing node(s) 800 via an appropriate network interface(s).

In some embodiments, a computer program including instructions which, when executed by at least one processor, causes the at least one processor to carry out the functionality of network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
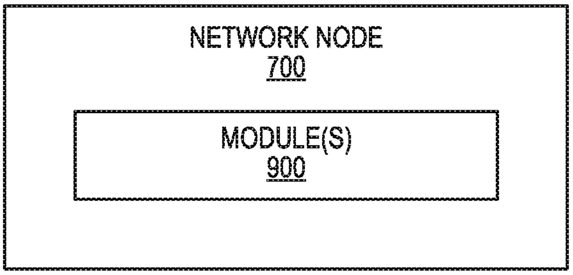

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein (e.g., one or more functions of a base station, LMF, or location server described herein). This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
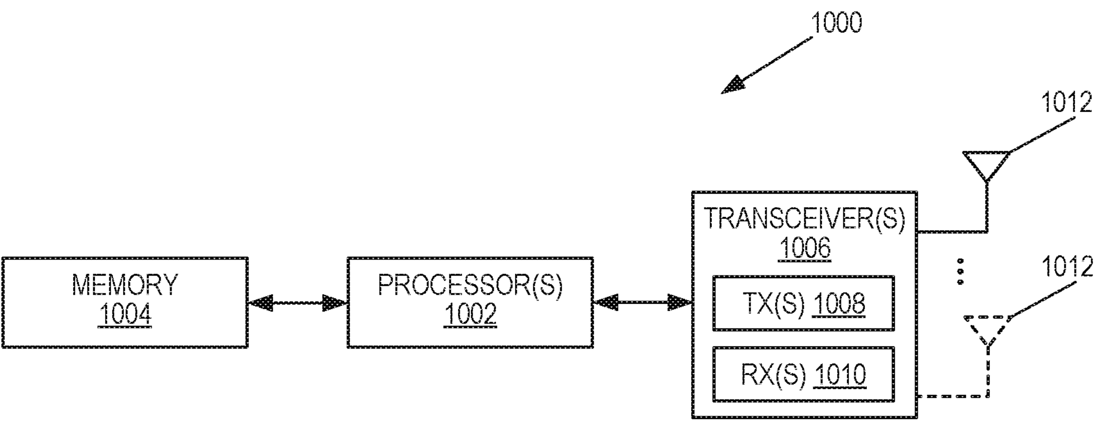
FIGS. 10 and 11 are schematic block diagrams of example embodiments of a wireless communication device, in which embodiments of the present disclosure may be implemented.

FIG. 10 is a schematic block diagram of a wireless communication device 1000 (e.g. the UE 312) according to some embodiments of the present disclosure. As illustrated, the wireless communication device 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the wireless communication device 1000 described above (e.g., one or more functions of the UE 312 described herein) may be fully or partially implemented in software that is, e.g., stored in the memory 1004 and executed by the processor(s) 1002. Note that the wireless communication device 1000 may include additional components not illustrated in Figure such as, e.g., one or more user interface components (e.g., an input/output interface including a display, buttons, a touch screen, a microphone, a speaker(s), and/or the like and/or any other components for allowing input of information into the wireless communication device 1000 and/or allowing output of information from the wireless communication device 1000), a power supply (e.g., a battery and associated power circuitry), etc.

In some embodiments, a computer program including instructions which, when executed by at least one processor, causes the at least one processor to carry out the functionality of the wireless communication device 1000 according to any of the embodiments described herein (e.g., one or more functions of a UE described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
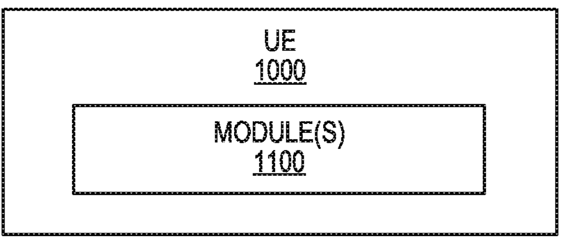

FIG. 11 is a schematic block diagram of the wireless communication device 1000 according to some other embodiments of the present disclosure. The wireless communication device 1000 includes one or more modules 1100, each of which is implemented in software. The module(s) 1100 provide the functionality of the wireless communication device 1000 described herein (e.g., one or more functions of the UE 312 described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a location server (316) for user equipment, UE, positioning, the method comprising:

- sending (Step 402, 402—1,500) one or more first New Radio Positioning Protocol Annex, NRPPa, messages to a base station (302-1A) that serves a target UE (312), wherein the one or more first NRPPa messages include an expected periodical reporting of the target UE and Quality of Service, QoS, information for the target UE so as to enable the base station to configure uplink, UL, grant resources; and
- receiving (Step 404, 404-1, 504) a second NRPPa message from the base station, which acknowledges a success or failure of the configured UL grants.

Embodiment 2: The method of embodiment 1 wherein the one or more first NRPPa messages further include a POSITIONING INFORMATION REQUEST to request the UL-SRS configuration of the target UE from the serving base station.

Embodiment 3: The method of embodiment 2 wherein the POSITIONING INFORMATION REQUEST, the expected periodical reporting of the target UE, and the QoS information for the target UE are sent over a same NRPPa message.

Embodiment 4: The method of embodiment 2 wherein the POSITIONING INFORMATION REQUEST, the expected periodical reporting of the target UE, and the QoS information for the target UE are sent over different NRPPa messages.

Embodiment 5: The method of embodiment 1 wherein the expected periodical reporting of the target UE and the QoS information for the target UE are sent over a same NRPPa message.

Embodiment 6: The method of embodiment 1 wherein the expected periodical reporting of the target UE and the QoS information for the target UE are sent over different NRPPa messages.

Embodiment 7: The method of embodiments 1-6 wherein the QoS information for the target UE includes at least one of QoS latency, QoS accuracy, and QoS positioning.

Embodiment 8: The method of embodiments 1-7, further comprising:

- sending (Step 402*a*, 502) an abort indication message to the base station to indicate the stop or the release of configured grant resources.

Group B Embodiments

Embodiment 9: A method performed by a base station (302-1A) for user equipment, UE, positioning, the base station serving a target UE (312), the method comprising:

- receiving (Step 402, 402-1, 600) one or more first New Radio Positioning Protocol Annex, NRPPa, messages from a location server (316), wherein the one or more first NRPPa messages include an expected periodical reporting of the target UE and Quality of Service, QoS, information for the target UE so as to enable the base station to configure uplink, UL, grant resources; and
- sending (Step 404, 404-1, 612) a second NRPPa message to the location server to acknowledge a success or failure of the configured UL grants.

Embodiment 10: The method of embodiment 9 wherein the one or more first NRPPa messages further includes a POSITIONING INFORMATION REQUEST to request the UL-SRS configuration of the target UE from the serving base station.

Embodiment 11: The method of embodiment 10 wherein the POSITIONING INFORMATION REQUEST, the expected periodical reporting of the target UE, and the QoS information for the target UE are received over a same NRPPa message.

Embodiment 12: The method of embodiment 10 wherein the POSITIONING INFORMATION REQUEST, the expected periodical reporting of the target UE, and the QoS information for the target UE are received over different NRPPa messages.

Embodiment 13: The method of embodiment 9 wherein the expected periodical reporting of the target UE and the QoS information for the target UE are sent over a same NRPPa message.

Embodiment 14: The method of embodiment 9 wherein the expected periodical reporting of the target UE and the QoS information for the target UE are sent over different NRPPa messages.

Embodiment 15: The methods of embodiments 9-14 wherein the QoS information for the target UE includes at least one of QoS latency, QoS accuracy, and QoS positioning.

Embodiment 16: The methods of embodiments 9-15 wherein the base station includes a next generation Node B central unit (gNB-CU) and a gNB distributed-unit (gNB-DU), wherein:

the gNB-CU considers the expected periodical reporting and the QoS information to adapt preconfigured UL transmissions for the target UE with periodicity of the positioning reporting; and the gNB-CU transmits the expected periodical reporting and the QoS information to the gNB-DU.

Embodiment 17: The method of embodiments 9-16, further comprising:

receiving (Step 402*a*, 602) an abort indication message from the location server, wherein the abort indication message indicates the stop or the release of configured grant resources.

Embodiment 18: The method of embodiments 9-17, further comprising:

prioritizing (Step 403, 604) among different UEs in allocation of UL grants based upon the received QoS information.

Embodiment 19: The method of embodiments 9-18, further comprising:

configuring (Step 403*a*, 606) UL grant resources for the target UE by considering the expected UE periodical reporting and the QoS information.

Embodiment 20: The method of embodiments 17, further comprising:

determining (Step 403*b*, 608) to release or abort configured UL grant resources based upon the received abort indication message.

Embodiment 21: The method of embodiment 20, further comprising:

releasing (Step 403*c*, 610) the configured UL grant resources to the target UE.

Group C Embodiment

Embodiment 22: A method performed by a user equipment, UE, (312) for positioning, the UE served by a base station (302-1A), the method comprising:

obtaining (Step 403*c*) UL grant resources (e.g., UL configured grants) configured by the base station, (e.g., wherein the UL grant resources are configured based upon expected UE periodical reporting and QoS information received by the base station from a location server); and providing (Step 410) measurements to the location server using the configured UL grant resources.

Group D Embodiments

Embodiment 23: A network node adapted to perform the method of any one of embodiments 1-21.

Embodiment 24: The network node of embodiment 23 wherein the network node comprises:

an interface (708)

processing circuitry associated with the interface, the processing circuitry configured to cause the network node to perform the method of any of embodiments 1 to 21.

Embodiment 25: A user equipment, UE, adapted to perform the method of embodiment 22.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
A-AoA Azimuth of Arrival
AD Assistance Data
AF Application Function
AMF Access and Mobility Function
AN Access Network
AP Access Point
ASIC Application Specific Integrated Circuit
AUSF Authentication Server Function
CPU Central Processing Unit
CS-RNTI Configured Scheduling Radio Network Temporary Identifier
DL Downlink
DL-AoD Downlink Angle-of-Departure
DL-TDOA Downlink Time Difference of Arrival
DN Data Network
DSP Digital Signal Processor
E-CID Enhanced Cell ID
eNB Enhanced or Evolved Node B
EPS Evolved Packet System
E-SMLC Evolved Serving Mobile Location Center
E-UTRA Evolved Universal Terrestrial Radio Access
F1AP F1 Application Protocol
FPGA Field Programmable Gate Array
gNB New Radio Base Station
gNB-CU New Radio Base Station Central Unit
gNB-DU New Radio Base Station Distributed Unit
HARQ Hybrid Automatic Repeat Request
HSS Home Subscriber Server
IoT Internet of Things
IP Internet Protocol
LOS Line of Sight
LTE Long Term Evolution
MME Mobility Management Entity
MTC Machine Type Communication
NEF Network Exposure Function
NF Network Function
NG-AP Next Generation Application Protocol
NLOS Non-Line of Sight
NR New Radio
NRF Network Function Repository Function
NSSF Network Slice Selection Function
OTT Over-the-Top
PC Personal Computer
PCF Policy Control Function
PDCCH Physical Downlink Control Channel
P-GW Packet Data Network Gateway
PRS Positioning Reference Signal
PUSCH Physical Uplink Shared Channel
QoS Quality of Service
RAM Random Access Memory
RAN Radio Access Network
ROM Read Only Memory
RRC Range Rate Correction
RRH Remote Radio Head
RSTD Reference Signal Time Difference
RTT Round Trip Time
SCEF Service Capability Exposure Function
SLP SUPL Location Platform
SMF Session Management Function
SUPL Secure User Plane Location
UDM Unified Data Management UE User Equipment
UL-AoA Uplink Angle of Arrival
UL-TDOA Uplink Time Difference of Arrival
UPF User Plane Function
Z-AoA Zenith of Arrival Those skilled in the art will recognize improvements and modifications to the embodiments of the present disclosure. All such improvements and modifications are considered within the scope of the concepts disclosed herein.

The invention claimed is:

1. A method performed by a location server for user equipment, UE, positioning, the method comprising:
sending one or more first New Radio Positioning Protocol Annex, NRPPa, messages to a base station that serves a target UE, wherein:
the one or more first NRPPa messages include an expected periodical reporting of the target UE and provide priority indication associated with positioning requirements of the target UE; and
the expected periodical reporting of the target UE at least indicates a periodicity with which the target UE reports positioning results to the location server; and
receiving a second NRPPa message from the base station, wherein the second NRPPa message acknowledges a success or failure of uplink, UL, grant resources configured by the base station.

2. The method of claim 1 wherein the one or more first NRPPa messages sent to the base station further include a request for UL Sounding Reference Signal, UL-SRS, configuration of the target UE from the serving base station.

3. The method of claim 2 wherein the request for the UL-SRS configuration of the target UE, the expected periodical reporting of the target UE, and the priority indication associated with the positioning requirements of the target UE are sent over a same first NRPPa message.

4. The method of claim 2 wherein the request of the UL-SRS configuration of the target UE, the expected periodical reporting of the target UE, and the priority indication associated with the positioning requirements of the target UE are sent over different first NRPPa messages.

5. The method of claim 2 wherein the second NRPPa message received from the base station further includes a response to provide the UL-SRS configuration of the target UE.

6. The method of claim 1 wherein the expected periodical reporting of the target UE and the priority indication associated with the positioning requirements of the target UE are sent over a same first NRPPa message.

7. The method of claim 1 wherein the expected periodical reporting of the target UE and the priority indication associated with the positioning requirements of the target UE are sent over different first NRPPa messages.

8. The method of claim 1 wherein the one or more first NRPPa messages sent to the base station further include Quality of Service, QoS, information of the target UE, which provides the priority indication associated with the positioning requirements of the target UE.

9. The method of claim 8 wherein the QoS information of the target UE includes at least one of QoS latency, QoS accuracy, and QoS positioning.

10. The method of claim 1, further comprising:
sending an abort indication message to the base station to indicate a stop or a release of configured grant resources.

11. The method of claim 1 wherein sending the one or more first NRPPa messages to the base station enables the base station to take the expected periodical reporting of the target UE into account to configure the UL grant resources.

12. A location server performing in user equipment, UE, positioning, comprising:
an interface; and
processing circuitry associated with the interface, the processing circuitry configured to cause the location server to:
send one or more first New Radio Positioning Protocol Annex, NRPPa, messages to a base station that serves a target UE, wherein:
the one or more first NRPPa messages include an expected periodical reporting of the target UE and provide priority indication associated with positioning requirements of the target UE; and
the expected periodical reporting of the target UE at least indicates a periodicity with which the target UE reports positioning results to the location server; and
receive a second NRPPa message from the base station, wherein the second NRPPa message acknowledges a success or failure of uplink, UL, grant resources configured by the base station.

13. A method performed by a base station in user equipment, UE, positioning, the base station serving a target UE, the method comprising:
receiving one or more first New Radio Positioning Protocol Annex, NRPPa, messages from a location server, wherein:
the one or more first NRPPa messages include an expected periodical reporting of the target UE and provide priority indication associated with positioning requirements of the target UE, such that the base station is enabled to take the expected periodical reporting of the target UE into account to configure uplink, UL, grant resources; and
the expected periodical reporting of the target UE at least indicates a periodicity with which the target UE reports positioning results to the location server; and
sending a second NRPPa message to the location server to acknowledge a success or failure of the configured UL grant resources.

14. The method of claim 13 wherein the one or more first NRPPa messages received from the location server further includes a request for UL Sounding Reference Signal, UL-SRS, configuration of the target UE.

15. The method of claim 14 wherein the request for the UL-SRS configuration of the target UE, the expected periodical reporting of the target UE, and the priority indication associated with the positioning requirements of the target UE are received over a same first NRPPa message.

16. The method of claim 14 wherein the request for the UL-SRS configuration of the target UE, the expected periodical reporting of the target UE, and the priority indication associated with the positioning requirements of the target UE are received over different first NRPPa messages.

17. The method of claim 14 wherein the second NRPPa message sent to the location server further includes a response to provide the UL-SRS configuration of the target UE.

18. The method of claim 13 wherein the expected periodical reporting of the target UE and the priority indication associated with the positioning requirements of the target UE are received over a same first NRPPa message.

19. The method of claim 13 wherein the expected periodical reporting of the target UE and the priority indication associated with the positioning requirements of the target UE are received over different first NRPPa messages.

20. The method of claim 13 wherein the one or more first NRPPa messages received from the location server further include Quality of Service, QoS, information of the target UE, which provides the priority indication associated with the positioning requirements of the target UE.

21. The method of claim 20 wherein the QoS information for the target UE includes at least one of QoS latency, QoS accuracy, and QoS positioning.

22. The method of claim 13 wherein the base station includes a next generation Node B central unit, gNB-CU, and a gNB distributed-unit, gNB-DU, wherein:

the gNB-CU considers the expected periodical reporting and the priority indication associated with the positioning requirements of the target UE to adapt preconfigured UL transmissions for the target UE with periodicity of the positioning reporting.

23. The method of claim 13 wherein the gNB-CU further transmits the expected periodical reporting and the priority indication associated with the positioning requirements of the target UE to the gNB-DU.

24. A base station performing in user equipment, UE, positioning, comprising:

an interface; and processing circuitry associated with the interface, the processing circuitry configured to cause the base station to:

receive one or more first New Radio Positioning Protocol Annex, NRPPa, messages from a location server, wherein:

the one or more first NRPPa messages include an expected periodical reporting of a target UE and provide priority indication associated with positioning requirements of the target UE, such that the base station is enabled to take the expected periodical reporting of the target UE into account to configure uplink, UL, grant resources; and the expected periodical reporting of the target UE at least indicates a periodicity with which the target UE reports positioning results to the location server; and send a second NRPPa message to the location server to acknowledge a success or failure of the configured UL grant resources.

25. A method performed by a user equipment, UE, in UE positioning, the UE served by a base station, the method comprising:

obtaining uplink, UL, grant resources configured by the base station, wherein:

the UL grant resources are configured based upon expected UE periodical reporting and priority indication associated with positioning requirements of the UE received by the base station from a location server; and the expected periodical reporting of the UE at least indicates a periodicity with which the UE reports positioning results to the location server; and providing measurements to the location server using the obtained UL grant resources.

26. A User Equipment, UE, which is served by a base station, performing in UE positioning, the UE comprising:

one or more transmitters;

one or more receivers; and processing circuitry associated with the one or more transmitters and the one or more receivers, the processing circuitry configured to cause the UE to:

obtain UL grant resources configured by the base station, wherein:

the UL grant resources are configured based upon expected UE periodical reporting and priority indication associated with the positioning requirements of the UE received by the base station from a location server; and the expected periodical reporting of the UE at least indicates a periodicity with which the UE reports positioning results to the location server; and provide measurements to the location server using the configured grant resources.

* * * * *